United States Patent Office 2,712,010
Patented June 28, 1955

2,712,010

PREPARATION OF HABIT-MODIFIED PROCAINE PENICILLIN

Sidney Alfred Vindin Deans, Rosemount, Quebec, and James Alexander Scarrow, Rosemere, Quebec, Canada, assignors, by mesne assignments, to American Home Products Corporation, New York, N. Y., a corporation of Delaware No Drawing. Application April 4, 1951,
Serial No. 219,322

5 Claims. (Cl. 260—239.1)

This invention relates to a process for the preparation of habit-modified crystalline procaine penicillin.

In the preparation of aqueous suspensions of procaine penicillin for intramuscular injection, it is desirable to have equidimensional rather than elongated crystalline particles. The tendency of equidimensional particles to block needles is markedly less than that of elongated particles.

Procaine penicillin prepared by expedients now known in the art, consists of elongated crystals in which the ratio of length to breadth may be as high as 6 to 1. These crystals are not readily converted to equidimensional particles by standard methods of comminution. Such procaine penicillin crystals have been prepared by reacting a salt of penicillin with a salt of procaine in water.

APPLICANTS' DEVELOPMENT

The applicants have now found that it is possible to prepare procaine penicillin crystals which have a ratio of length to breadth approximately equal to two to one and which are more readily comminuted to equidimensional particles than the elongated crystals prepared by the methods of the prior art.

The applicants have found that a desirable product can be prepared at a temperature of at least 25° C. from the interaction of a procaine salt and a penicillin salt in an aqueous medium containing a substantial amount of an inert water-soluble organic diluent and a water-soluble salt. The penicillin and procaine salts must obviously be water-soluble since they are added to the reaction mixture in aqueous solution as described below in the examples.

The procaine salts used are preferably the hydrochloride, the acetate, the sulphate and the nitrate. Penicillins F, G, and K, and X are preferably used in the form of their potassium, sodium, ammonium, or triethylamine salts.

The water-soluble organic inert diluent used is preferably selected from the group consisting of methanol, ethanol, n-propanol, isopropanol, isobutanol, t-butanol, ethylene glycol, propylene glycol, glycerol, acetone, methyl ethyl ketone and dioxane.

The water-soluble salt which is added to the aqueous medium is one which has a cation selected from the group consisting of sodium, potassium, ammonium, and an anion selected from the group consisting of nitrate, chloride, nitrite, chlorate, acetate and citrate.

The reaction medium is preferably made up from approximately 16 parts by volume of water, at least 7 parts by volume of the inert water-soluble organic diluent and at least 25% by weight of a water-soluble salt (based on the weight of penicillin salt employed).

In the process of the present invention the temperature is preferably higher than 25° C. and the pH of the reaction medium is from about 5 to about 8.

The function of the inert water-soluble organic diluent and the water-soluble salt in the reaction medium is to modify the crystal habit of the procaine penicillin with the object of producing more or less equidimensional crystals or aggregates of such crystals instead of the elongated crystals obtained from an aqueous medium at room temperature. Such equidimensional crystals may be comminuted to produce more satisfactory crystalline particles for use in aqueous suspensions of procaine penicillin administered by intramuscular injection.

EXAMPLES

The present invention will be more fully understood by referring to the following examples which should be taken in an illustrative sense only.

*Example 1*

A sterile solution consisting of 5 grams of crystalline sodium penicillin with a potency of 1550 units per mg., 1.25 grams of sodium nitrate and 20 cc. of water was heated to 30° C. To the solution was added with vigorous stirring 14 cc. of sterile ethanol at 30° C. followed by a sterile solution consisting of 4 grams of procaine hydrochloride and 20 cc. of water heated to 30° C. The mixture was stirred vigorously and cooled at approximately 1° C. per minute. Crystallization of procaine penicillin began approximately 80 seconds after the addition of the procaine hydrochloride solution. The solution was maintained at 5° C. for 18 hours. The sterile procaine penicillin was separated by filtration using sterile technique and washed in turn with sterile water, isopropanol and ether, precooled to 4° C. The product was dried under sterile conditions, the weight being 7.4 grams and the potency 1000 units per mg. The recovery was therefore 95%. The crystals ranged from 70 to 530 microns in length, the ratio of length to breadth being approximately 2 to 1. The crystals showed a definite tendency to form aggregates.

*Example 2*

A sterile solution consisting of 2 grams of crystalline potassium penicillin with a potency of 1550 units per mg., 0.2 gram of potassium acetate and 8 cc. of water was heated to 30° C. To the solution was added with vigorous stirring 7 cc. of sterile ethanol, followed by a sterile solution consisting of 1.6 grams of procaine hydrochloride and 4 cc. of water preheated at 30° C. The mixture was stirred vigorously and cooled at approximately 1° C. per minute. Crystallization of procaine penicillin began approximately 120 seconds after the addition of procaine hydrochloride solution. The solution was maintained at 4° C. for 18 hours. The sterile procaine penicillin was separated by filtration under sterile conditions, and washed in turn with sterile water, isopropanol and ether precooled to 4° C. The product was dried under sterile conditions, the weight being 3 grams and the potency 1000 units/mg. The recovery was therefore 97%. The crystals ranged from 25 to 700 microns in length, the ratio of length to breadth being approximately 2 to 1. The crystals showed a definite tendency to form aggregates.

In another experiment in which sodium acetate was used instead of potassium acetate, the recovery of procaine penicillin was 92% and the length of the crystals ranged from 100 to 700 microns, the ratio of length to breadth being approximately 2 to 1.

*Example 3*

A sterile solution consisting of 8334 grams of crystalline potassium penicillin with a potency of 1550 units per mg., 2000 grams of potassium nitrate and 32 litres of water was heated to 30° C. To a solution was added with vigorous stirring 28 litres of sterile ethanol at 30° C., followed by a sterile solution consisting of 6400 grams of procaine hydrochloride and 32 litres of distilled water heated to 30° C. The mixture was stirred vigorously.

The resulting exothermic reaction causes the temperature to rise to 35° C. The mixture was cooled at approximately 0.5° C. per minute. Crystallization of the procaine penicillin began approximately 2 minutes after the addition of the procaine hydrochloride solution. Stirring was continued for 18 hours, the final temperature of the solution being 4° C. The sterile procaine penicillin was separated by filtration under aseptic conditions and washed in turn with sterile water, isopropanol, and ether, precooled at 4° C. The product was dried under sterile conditions, the weight being 11,343 grams and the potency 1000 units per mg. The recovery was therefore 88%. The crystals ranged from 5 to 250 microns in length, and the ratio of length to breadth being approximately 2 to 1. The crystals showed some tendency to form aggregates.

We claim:

1. A process of preparing habit-modified procaine penicillin crystals having a ratio of length to breadth of approximately 2 to 1 which comprises mixing an aqueous solution containing a dissolved water-soluble salt of penicillin selected from the class consisting of the potassium, sodium, ammonium and triethylamine salts and containing also a dissolved inorganic water-soluble salt having a cation selected from the class consisting of sodium, potassium and ammonium and an anion selected from the class consisting of nitrate, chloride, nitrite, chlorate, acetate and citrate, with a substantial amount of an inert, water-soluble organic diluent selected from the group consisting of methanol, ethanol, n-propanol, isopropanol, n-butanol, isobutanol, ethylene glycol, propylene glycol, glycerol, acetone, methyl ethyl ketone and dioxane, adding to the mixture an aqueous solution of a dissolved water-soluble procaine salt selected from the class consisting of the hydrochloride, acetate, sulfate and nitrate, the temperature being so regulated that the resultant mixture has a temperature in the approximate range 25°–35° C., vigorously agitating the mixture, rapidly cooling the mixture, allowing the mixture to stand for several hours at a reduced temperature, and recovering from the mixture crystals of procaine penicillin having a ratio of length to breadth of approximately 2 to 1.

2. A process according to claim 1 in which the water-soluble salt is sodium nitrate.

3. A process according to claim 2 in which the inert water-soluble organic diluent is ethanol and the crystallization is carried out at substantially 30° C.

4. A process according to claim 1, in which the water-soluble salt is potassium nitrate.

5. A process according to claim 1, in which the amount of inorganic water-soluble salt is at least 25% by weight of the salt of penicillin.

References Cited in the file of this patent

UNITED STATES PATENTS

| | | |
|---|---|---|
| 2,515,898 | Rhodehamel | July 18, 1950 |
| 2,520,098 | Hodge | Aug. 22, 1950 |
| 2,547,640 | Goldman | Apr. 3, 1951 |
| 2,643,251 | Staab | June 23, 1953 |

FOREIGN PATENTS

| | | |
|---|---|---|
| 503,953 | Canada | June 29, 1954 |
| 654,279 | Great Britain | June 13, 1951 |
| 673,555 | Great Britain | June 11, 1950 |
| 681,140 | Great Britain | Oct. 15, 1952 |

OTHER REFERENCES

The Chemistry of Penicillin, Princeton U. Press, 1949, pp. 20, 220.

Salivar et al., "J. Am. Chem. Soc., vol. 70, Mar. 1948, pp. 1287–88.

Norris, "Experimental Org. Chem.," 2nd ed. (1924), p. 7.